(12) United States Patent
Kuroshita et al.

(10) Patent No.: US 11,268,614 B2
(45) Date of Patent: Mar. 8, 2022

(54) WORKING VEHICLE

(71) Applicant: KUBOTA CORPORATION, Osaka (JP)

(72) Inventors: Yoshihiko Kuroshita, Sakai (JP); Tetsuo Yamaguchi, Sakai (JP); Michita Kono, Sakai (JP); Hitoshi Azuma, Sakai (JP); Shinji Ohara, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/893,491

(22) Filed: Jun. 5, 2020

(65) Prior Publication Data
US 2020/0393041 A1 Dec. 17, 2020

(30) Foreign Application Priority Data
Jun. 11, 2019 (JP) .............................. JP2019-109100

(51) Int. Cl.
*F16H 61/16* (2006.01)
*B60K 17/02* (2006.01)
(Continued)

(52) U.S. Cl.
CPC ............ *F16H 61/16* (2013.01); *B60K 17/02* (2013.01); *F16H 59/54* (2013.01); *F16H 61/21* (2013.01);
(Continued)

(58) Field of Classification Search
None
See application file for complete search history.

(56) References Cited

U.S. PATENT DOCUMENTS 5,048,655 A 9/1991 Seeba
5,626,536 A * 5/1997 Kono .................... B60W 10/02
477/181

(Continued)

FOREIGN PATENT DOCUMENTS

EP 1 764 253 A1 3/2007
EP 1764253 A1 * 3/2007 ............. B62D 11/14
(Continued)

OTHER PUBLICATIONS

English translation of JP 732. (Year: 2020).*
EP '046 Search Opinion (Year: 2020).*

*Primary Examiner* — Dirk Wright
(74) *Attorney, Agent, or Firm* — Keating and Bennett, LLP

(57) ABSTRACT

A working vehicle includes a traveling clutch to be switched between an engaging state and a disengaging state, a brake to brake the traveling device according to an operation of a brake operator, and a controller to perform a braking control to perform the braking, and an auto-switching controller to switch the traveling clutch from the engaging state to the disengaging state. The controller performs a first processing to switch the traveling clutch from the engaging state to the disengaging state when the brake operator is operated in a case where the auto-switching control is valid and a vehicle speed is less than a threshold, and a second processing to prevent the traveling clutch from being switched from the engaging state to the disengaging state even when the brake operator is operated in a case where the vehicle speed is equal to or higher than the threshold.

9 Claims, 10 Drawing Sheets

(51) Int. Cl.
*F16H 59/54* (2006.01)
*F16H 61/21* (2006.01)

(52) U.S. Cl.
CPC ... *B60Y 2200/221* (2013.01); *F16H 2061/165* (2013.01); *F16H 2061/168* (2013.01); *F16H 2710/10* (2013.01)

(56) References Cited

U.S. PATENT DOCUMENTS

| | | | |
|---|---|---|---|
| 9,133,604 B2 * | 9/2015 | Kodaka | E02F 9/2292 |
| 9,540,004 B2 | 1/2017 | Kim et al. | |
| 9,746,070 B2 * | 8/2017 | McGuire | F16H 63/44 |
| 10,293,800 B2 * | 5/2019 | Yokoyama | F16D 65/18 |

FOREIGN PATENT DOCUMENTS

| | | |
|---|---|---|
| EP | 2 815 938 A1 | 12/2014 |
| JP | 2003-172379 A | 6/2003 |
| JP | 2005-299732 A | 10/2005 |
| JP | 2016-070465 A | 5/2016 |
| JP | 2016-200274 A | 12/2016 |
| WO | 2015/184132 A1 | 12/2015 |

\* cited by examiner

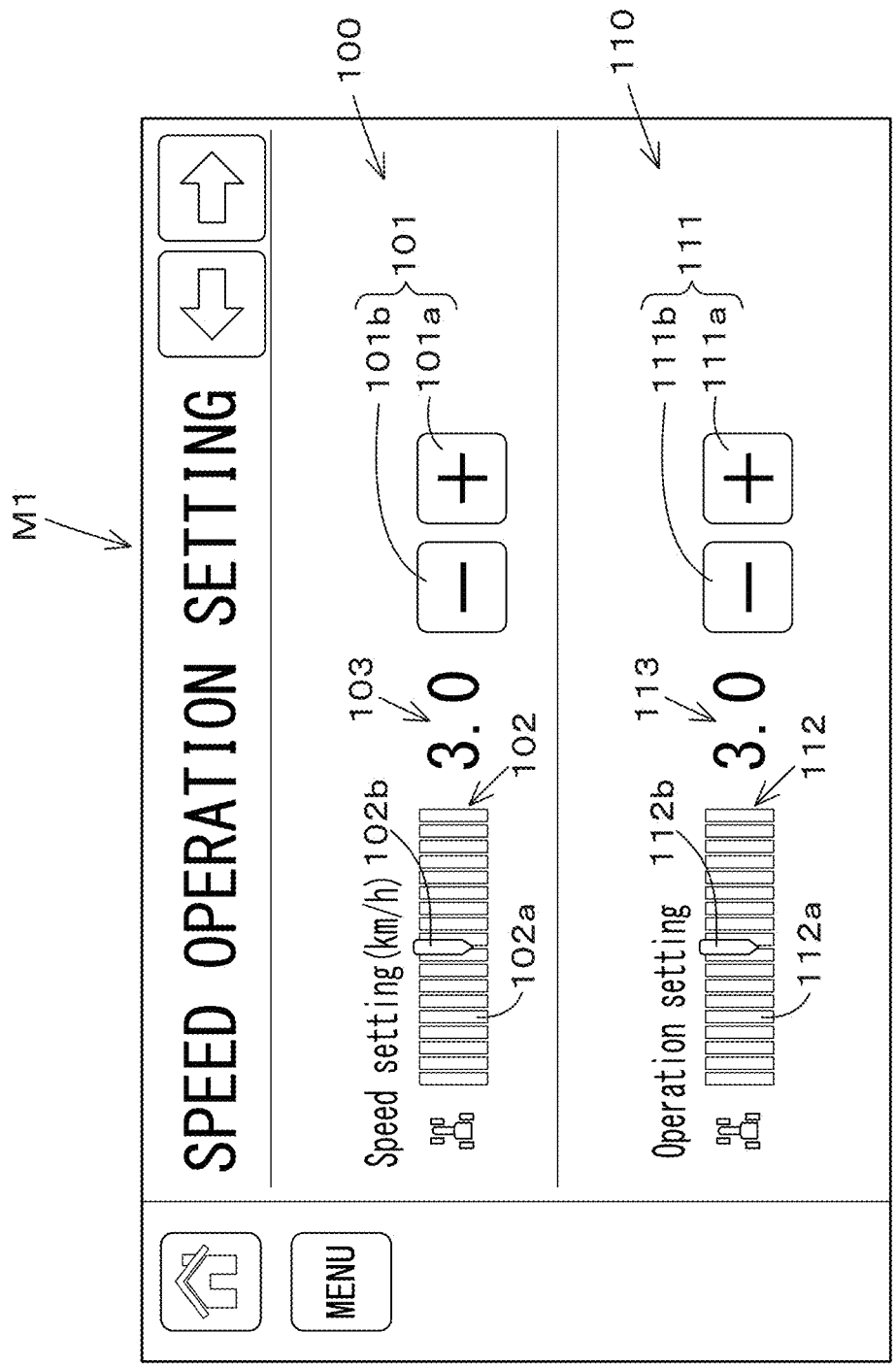

FIG.6A

| No | Auto disengaging mode | Switching forward/backward traveling | Vehicle speed (km/h) | Clutch pedal | Brake pedal | Traveling clutch |
|---|---|---|---|---|---|---|
| 1 | Invalid | Forward(F) or Backward(R) | Less than Threshold E1 | OFF | OFF | Engaging |
| 2 | | | | OFF | ON | Engaging |
| 3 | | | | ON | OFF | Disengaging |
| 4 | | | | ON | ON | Disengaging |
| 5 | | | Threshold E1 or more | OFF | OFF | Engaging |
| 6 | | | | OFF | ON | Engaging |
| 7 | | | | ON | OFF | Disengaging |
| 8 | | | | ON | ON | Disengaging |

| No | Auto disengaging mode | Switching forward/backward traveling | Vehicle speed (km/h) | Clutch pedal | Brake pedal | Traveling clutch |
|---|---|---|---|---|---|---|
| 9 | Invalid | Neutral(N) | Less than Threshold E1 | OFF | OFF | Disengaging |
| 10 | | | | OFF | ON | Disengaging |
| 11 | | | | ON | OFF | Disengaging |
| 12 | | | | ON | ON | Disengaging |
| 13 | | | Threshold E1 or more | OFF | OFF | Disengaging |
| 14 | | | | OFF | ON | Disengaging |
| 15 | | | | ON | OFF | Disengaging |
| 16 | | | | ON | ON | Disengaging |

FIG.6B

Table 1 (rows 17-24):

| No. | Auto disengaging mode | Pre-status ||||||| Post-status |||||||
|---|---|---|---|---|---|---|---|---|---|---|---|---|---|---|
| | | Switching F/R traveling | Vehicle speed (km/h) | Clutch pedal | Brake pedal | Traveling clutch | Shuttle switching (F),(R)→(N) | (N) switching | Clutch pedal ||| Brake pedal ||| Seating detection |
| | | | | | | | | | OFF | ON | Mode | OFF | ON | Mode | Switching ON→OFF | ON→OFF |
| 17 | Valid | Forward (F) or Reverse (R) | Less than Threshold A1 | OFF | OFF | Engaging | | | — | Disengaging | Hold valid | Engaging | Disengaging/1st processing | Hold valid | Hold engaging | Hold engaging |
| 18 | | | | | ON | Disengaging/1st processing | | | Hold disengaging | Switch invalid | — | Hold valid | Hold disengaging to (N) | Hold disengaging to (N) |
| 19 | | | | ON | OFF | Disengaging | | Hold disengaging | Engaging | — | Hold valid | — | Hold disengaging | Switch invalid | Hold disengaging | Hold disengaging |
| 20 | | | | | ON | | | | Hold disengaging | — | | Disengaging | — | Hold valid | Hold disengaging to (N) | Hold disengaging to (N) |
| 21 | | | Threshold A1 or more | OFF | OFF | Engaging | | | — | Disengaging | Switch invalid | Engaging/2nd processing | Hold engaging | Switch invalid | Hold engaging | Hold engaging |
| 22 | | | | | ON | Engaging/2nd processing | | (N) switching | — | — | | Hold disengaging | — | Hold valid | Hold disengaging | Hold disengaging |
| 23 | | | | ON | OFF | Disengaging | | | — | — | Hold valid | Engaging | — | Hold valid | Hold disengaging | Hold disengaging |
| 24 | | | | | ON | | Hold disengaging | Engaging | — | — | | — | — | | | |

Table 2 (rows 25-32):

| No. | Auto disengaging mode | Pre-status ||||||| Post-status |||||||
|---|---|---|---|---|---|---|---|---|---|---|---|---|---|---|
| | | Switching F/R traveling | Vehicle speed (km/h) | Clutch pedal | Brake pedal | Traveling clutch | Shuttle switching (N)→(F),(R) | Clutch pedal ||| Brake pedal ||| Seating detection |
| | | | | | | | | OFF | ON | Mode | OFF | ON | Mode | Switching ON→OFF | ON→OFF |
| 25 | Valid | Neutral (N) | Less than Threshold A1 | OFF | OFF | Disengaging | Engaging | — | Hold disengaging | Hold valid | — | Hold disengaging | Hold valid | Hold disengaging | Hold disengaging |
| 26 | | | | | ON | | Hold disengaging | Hold disengaging | — | Switch invalid | Hold disengaging | — | Switch invalid | | |
| 27 | | | | ON | OFF | | Engaging | Hold disengaging | — | Hold valid | — | Hold disengaging | Hold valid | | |
| 28 | | | | | ON | | | Hold disengaging | — | | Hold disengaging | — | Switch invalid | | |
| 29 | | | Threshold A1 or more | OFF | OFF | | Engaging | — | Hold disengaging | | — | Hold disengaging | Hold valid | | |
| 30 | | | | | ON | | | — | — | Switch invalid | Hold disengaging | — | Switch invalid | | |
| 31 | | | | ON | OFF | | Hold disengaging | Hold disengaging | — | Hold valid | — | Hold disengaging | Hold valid | | |
| 32 | | | | | ON | | | Hold disengaging | — | | Hold disengaging | — | | | |

WORKING VEHICLE

CROSS REFERENCE TO RELATED APPLICATIONS

This application claims the benefit of priority to Japanese Patent Application No. 2019-109100 filed on Jun. 11, 2019. The entire contents of this application are hereby incorporated herein by reference.

BACKGROUND OF THE INVENTION

1. Field of the Invention

The present invention relates to a working vehicle.

2. Description of Related Art

US Patent Publication No. 5048655 and Japanese Unexamined Patent Publication No. 2003-172379 are known as techniques for disengaging a clutch for transmitting power to a traveling device when braking to a vehicle is operated. In the construction vehicle disclosed in US Patent Publication No. 5048655, the clutch for transmitting power to a crawler is disengaged by pressing down the brake.

In Japanese Unexamined Patent Publication No. 2003-172379, a brake force sensor configured to detect an operation force of the brake is provided in a tractor employing a hydraulic clutch as a main clutch of a traveling-driving system, and an operating pressure of the main clutch is controlled based on the operation force of the brake.

SUMMARY OF THE INVENTION

A working vehicle includes a traveling clutch to be switched between an engaging state allowing power to be transmitted to a traveling device and a disengaging state cutting the power to be transmitted to the traveling device; a brake to brake the traveling device according to an operation of a brake operator; a controller to perform a braking control to perform the braking according to the operation of the brake operator; and an auto-switching controller to switch the traveling clutch from the engaging state to the disengaging state according to the operation of the brake operator; and a switch to switch the auto-switching controller between a valid state and an invalid state, wherein the controller performs a first processing to switch the traveling clutch from the engaging state to the disengaging state when the brake operator is operated in a case where the auto-switching control is valid and a vehicle speed of the traveling device is less than a threshold; and a second processing to prevent the traveling clutch from being switched from the engaging state to the disengaging state even when the brake operator is operated in a case where the vehicle speed of the traveling device is equal to or higher than the threshold.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings, wherein:

FIG. 4 is a view illustrating an example of a setting screen according to a preferred embodiment of the present invention.

FIG. 6A is a view illustrating a relation between a position of a clutch lever, a vehicle speed, an operation of the clutch pedal, an operation of the brake pedal, and the like under a state where the auto-switching control is invalid according to a preferred embodiment of the present invention.

FIG. 6B is a view illustrating a relation between a position of a clutch lever, a vehicle speed, an operation of the clutch pedal, an operation of the brake pedal, and the like under a state where the auto-switching control is valid according to a preferred embodiment of the present invention.

DETAILED DESCRIPTION OF THE PREFERRED EMBODIMENTS

Figure 1:
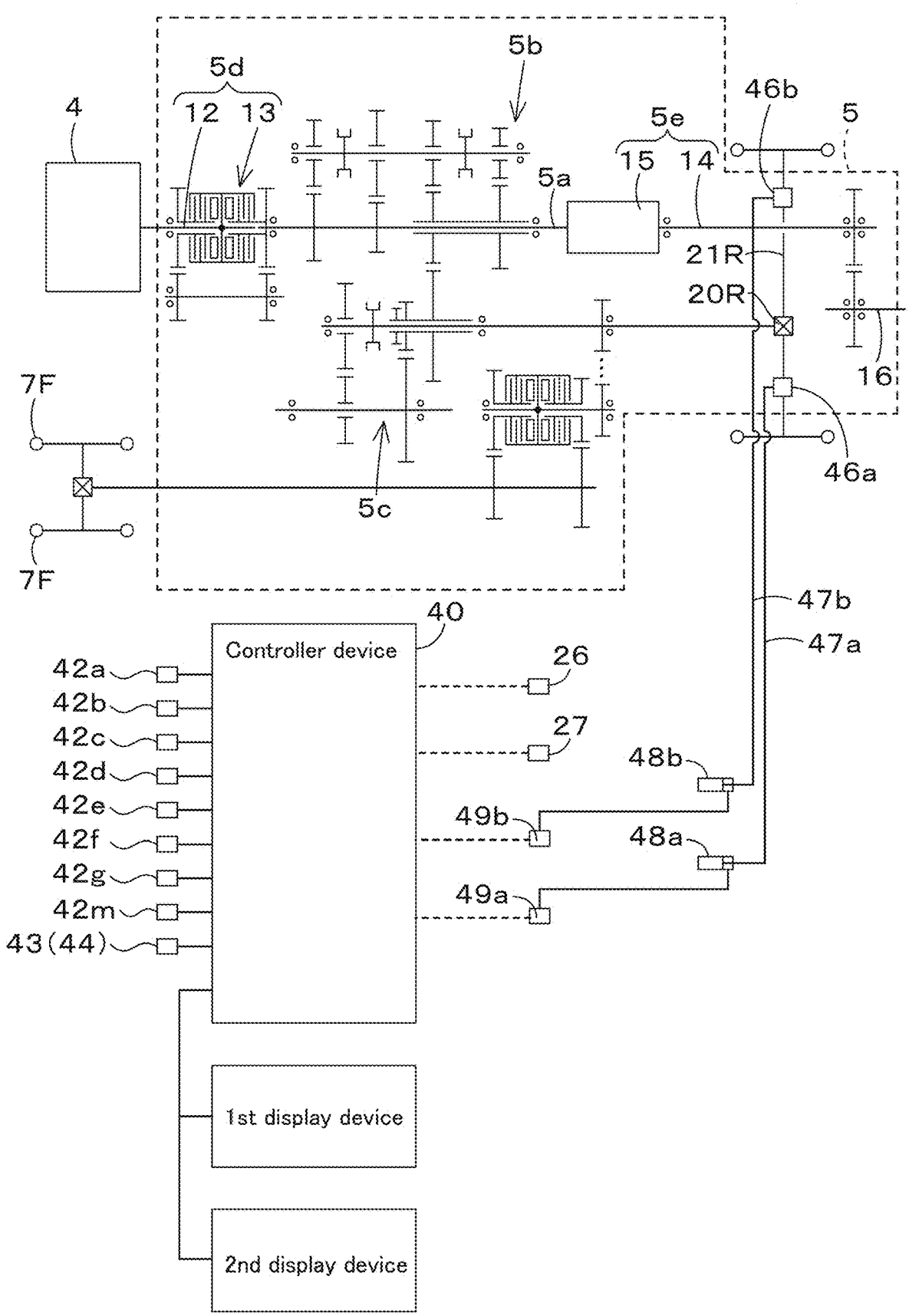
FIG. 1 is a view illustrating a configuration of a tractor and illustrating a control block diagram according to a preferred embodiment of the present invention.

The preferred embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 7:
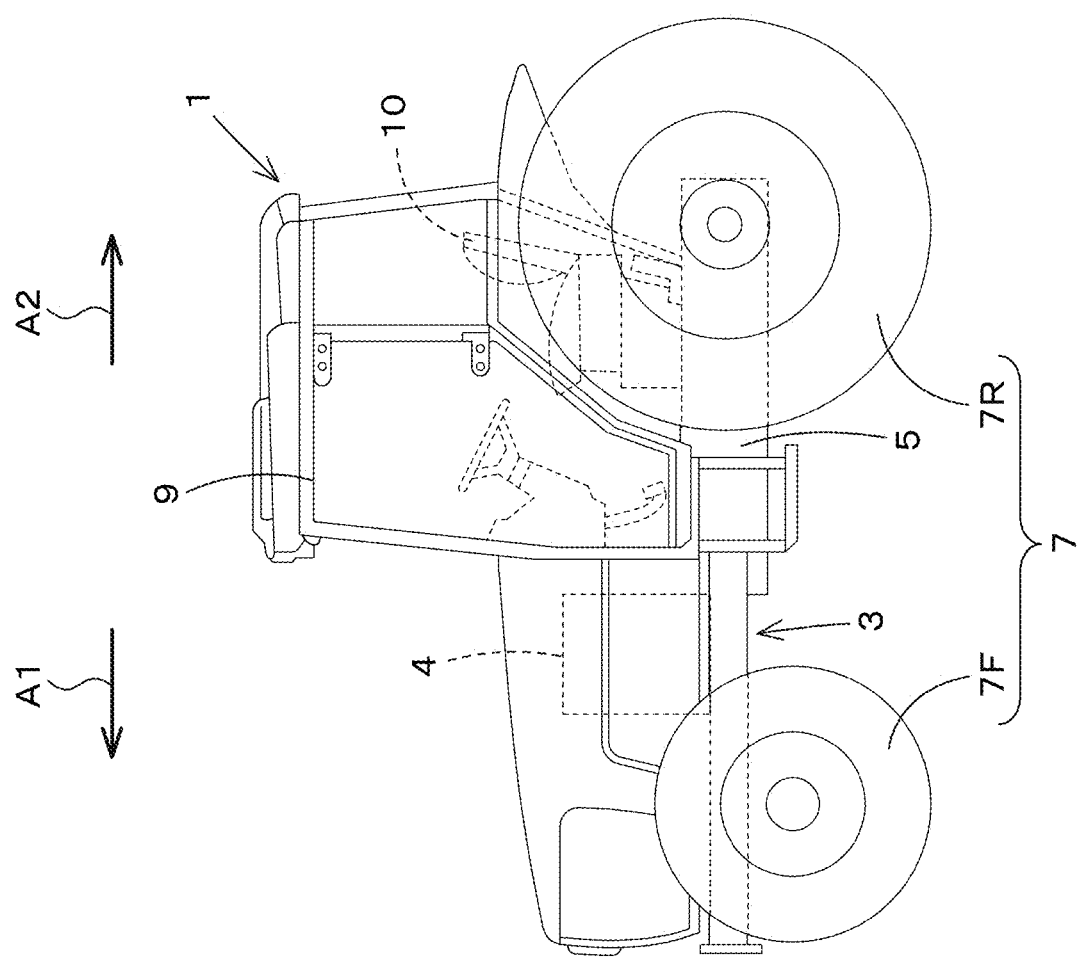
FIG. 7 is a whole view illustrating a tractor according to various preferred embodiments of the present invention.

FIG. 7 is a side view showing a preferred embodiment of a working vehicle 1, and FIG. 7 is a plan view showing the present preferred embodiment of the working vehicle 1. In the present preferred embodiment, the working vehicle 1 is a tractor. However, the working vehicle 1 is not limited to the tractor, and may be an agricultural machine (an agricultural vehicle) such as a combine and a transplanter, or a construction machine (a construction vehicle) such as a loader working machine.

Hereinafter, in the following description, the front side of the operator sitting on a operator seat 10 of the tractor (the working vehicle) 1 (a direction indicated by an arrowed line A1 in FIG. 7) is referred to as the front, the rear side of the operator (a direction indicated by an arrowed line A2 in FIG. 7) is referred to as the rear, the left side of the operator is referred to as the left, and the right side of the operator is referred to as the right. In addition, a horizontal direction, which is a direction orthogonal to the front-rear direction of the working vehicle 1, will be described as a vehicle width direction.

As shown in FIG. 7, the tractor 1 includes a vehicle body 3, a prime mover 4, and a transmission 5. The vehicle body 3 includes a traveling device 7 and is configured to travel. The traveling device 7 is a device having front wheels 7F and rear wheels 7R. The front wheels 7F may be a tire type or a crawler type. In addition, the rear wheels 7R may also be a tire type or a crawler type.

The prime mover 4 is a diesel engine, an electric motor, or the like, and preferably is a diesel engine in this preferred embodiment. The speed change device 5 is configured to switch the propulsive force of the traveling device 7 through speed changing, and is also configured to switch the traveling device 7 between forward traveling and reverse traveling. The vehicle body 3 is provided with an operator seat 10.

A connecting portion is provided on the rear portion of the vehicle body 3. A working device can be attached to and detached from the connecting portion. By connecting the working device to the connecting portion, the working device can be pulled by the vehicle body 3. The working device is a tiller device for tilling, a fertilizer sprayer device for spraying fertilizer, a pesticide sprayer device for spraying pesticides, a harvester device for harvesting, a mower device for mowing grass and the like, a tedder device for tedding grass and the like, a raking device for raking grass and the like, a baler device for baling grass and the like, or the like.

Figure 2:
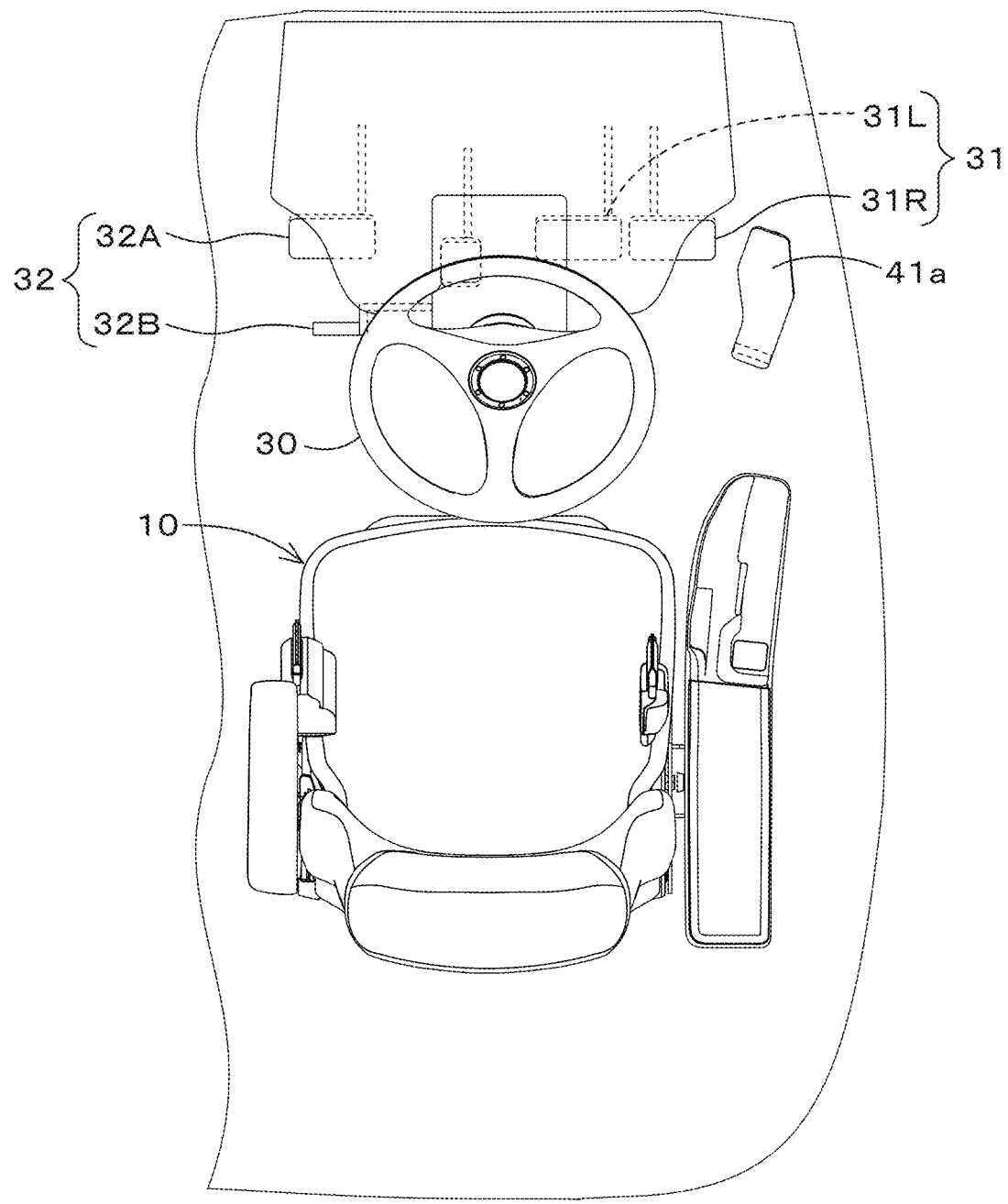
FIG. 2 is a view illustrating a periphery of an operator seat according to a preferred embodiment of the present invention.

As shown in FIG. 2, a steering wheel 30 for steering the vehicle body 3, a braking-operation member 31, and a clutch-switching member 32 are provided around the operator seat 10. The braking-operation member 31 includes a plurality of operating portions, for example, a brake pedal 31L provided on the left side and a brake pedal 31R provided on the right side. The brake pedal 31L and the brake pedal 31R are swingably supported by the vehicle body 3, and are configured to be operated by an operator sitting on the operator seat 10.

The clutch-switching member 32 includes a clutch pedal 32A and a clutch lever 32B. The clutch pedal 32A is swingably supported by the vehicle body 3, and is configured to be operated by the operator sitting on the operator seat 10 in the manner same as those of the brake pedal 31L and the brake pedal 31R. The clutch lever 32B is swingably supported in the vicinity of the steering wheel 30, and is configured to be switched between a forward-traveling position (F), a reverse-traveling position (R), and a neutral position (N).

As shown in FIG. 1, the transmission 5 includes a main shaft (a propulsion shaft) 5a, a main transmission portion 5b, an sub-transmission portion 5c, a traveling clutch 5d, and a PTO power transmission portion 5e. The propulsion shaft 5a is rotatably supported by the housing case (a mission case) of the transmission 5, and the power from the crankshaft of the prime mover 4 is transmitted to the propulsion shaft 5a. The main transmission portion 5b includes a plurality of gears and a shifter configured to change the engaging of the gears. The main transmission portion 5b appropriately changes the engaging (meshing) of the plurality of gears with the shifter, and thus changes and outputs (shifts) the revolving inputted from the propulsion shaft 5a.

The sub-transmission portion 5c includes a plurality of gears and a shifter configured to change the engaging of the gears. The sub-transmission portion 5c appropriately changes the engaging (meshing) of the plurality of gears with the shifter, and consequently changes and outputs (shifts) the revolving inputted from the main transmission 5b.

The traveling clutch 5d is a clutch configured to be switched between an engaging state to transmit the power to the traveling device 7 (the front wheels 7F and the rear wheels 7R) and a disengaging state to disengage the transmission of power to the traveling device 7. The traveling clutch 5d includes a shuttle shaft 12 and a clutch-switching portion 13. The power outputted from the prime mover 4 is transmitted to the shuttle shaft 12. The clutch-switching portion 13 is a hydraulic clutch configured to be switched between a forward-traveling side, a reverse-traveling side, and a neutral side.

The clutch-switching portion 13 is connected to a forward-traveling switching valve 26 and a reverse-traveling switching valve 27 that are connected through a fluid tube (not shown in the drawings) or the like. The forward-traveling switching valve 26 and the reverse-traveling switching valve 27 preferably include, for example, two-position electromagnetic switching valves. When the solenoid of the forward-traveling switching valve 26 is magnetized, the clutch-switching portion 13 switches to the forward-traveling side, and when the solenoid of the reverse-traveling switching valve 27 is magnetized, the clutch-switching portion 13 switches to the reverse-traveling side. When each of the solenoids of the forward-traveling switching valve 26 and the reverse-traveling switching valve 27 is demagnetized, the clutch-switching portion 13 switches to the neutral side.

The clutch-switching member 32 is capable of switching the clutch-switching portion 13. When the clutch lever 32B is in the forward-traveling position (F), the solenoid of the forward-traveling switching valve 26 is magnetized, while the solenoid of the reverse-traveling switching valve 27 remains demagnetized, and the clutch-switching portion 13 is switched to the forward-traveling side. When the clutch lever 32B is in the reverse position (R), the solenoid of the reverse-traveling switching valve 27 is magnetized, while the solenoid of the forward-traveling switching valve 26 is kept being demagnetized, and the clutch-switching portion 13 is switched to the reverse-traveling side. When the clutch lever 32B is in the neutral position (N), the demagnetization of the solenoids of the forward-traveling switching valve 26 and the reverse-traveling switching valve 27 is maintained, and the clutch-switching portion 13 is switched to the neutral side.

When the clutch pedal 32A is operated in the state where the clutch lever 32B is in the forward-traveling position (F) and the reverse-traveling position (R), one of the solenoids of the forward-traveling switching valve 26 and the reverse-traveling switching valve 27 is magnetized, and thus the clutch switching portion 13 is switched, to the neutral side, from the forward-traveling side or the reverse-traveling side.

The shuttle shaft 12 is connected to the propulsion shaft 5a. The power of the propulsion shaft 5a is transmitted to the main transmission portion 5b and the sub transmission portion 5c, and the power outputted from the sub transmission portion 5c is transmitted to the rear-wheel differential device 20R. The rear-wheel differential device 20R rotatably supports a rear axle 21R to which the rear wheel 7R is attached. That is, the traveling clutch 5d is in the engaging state, and transmits the power to the traveling device 7 (the front wheels 7F and the rear wheels 7R) when the clutch-switching portion 13 is switched to either the forward-traveling side or the reverse-traveling side. When the clutch-switching portion 13 is switched to the neutral side, the traveling clutch 5*d* is in the disengaged state, and cuts the transmission of power to the traveling device 7.

The PTO power transmission portion 5*e* includes a PTO propulsion shaft 14 and a PTO clutch 15. The PTO propulsion shaft 14 is rotatably supported and is configured to transmit the power supplied from the propulsion shaft 5*a*. The PTO propulsion shaft 14 is connected to the PTO shaft 16 through the gears or the like. The PTO clutch 15 preferably is, for example, a hydraulic clutch or the like, and when engaged or disengaged, the hydraulic clutch switches between a state where the power of the propulsion shaft 5*a* is transmitted to the PTO propulsion shaft 14 and a state where the power of the propulsion shaft 5*a* is not transmitted to the PTO propulsion shaft 14.

As shown in FIG. 1, the tractor 1 includes a braking device. The braking device includes a left braking device 46*a* and a right braking device 46*b*. The left braking device 46*a* and the right braking device 46*b* are disc-type braking devices, and are configured to be switched between a braking state to perform the braking and a releasing state to release the braking. The left braking device 46*a* is provided on the left side of the rear axle 21R, and the right braking device 46*b* is provided on the right side of the rear axle 21R. When the operator who drives the tractor 1 operates (steps on) the brake pedal 31L, the left connecting member 47*a* connected to the brake pedal 31L is moved in a direction for the braking, and the left braking device 46*a* can be brought into the braking state. When the operator operates (steps on) the brake pedal 31R, the right connecting member 47*b* connected to the brake pedal 31R is moved in a direction for the braking, and the right braking device 46*b* can be brought into the braking state.

In addition, the left hydraulic operating portion 48*a*, which is operated by the operation fluid, is connected to the left connecting member 47*a*. A left brake valve 49*a* is connected to the left hydraulic operating portion 48*a* through a fluid tube. The left connecting member 47*a* can be moved in a direction for the braking when the left hydraulic operating portion 48*a* is operated with the left braking valve 49*a*. In addition, the right hydraulic operating portion 48*b*, which is operated by the operation fluid, is connected to the right connecting member 47*b*. A right brake valve 49*b* is connected to the right hydraulic operating portion 48*b* through a fluid tube. The right connecting member 47*b* can be moved in a direction for the braking when the right hydraulic operating portion 48*b* is operated with the right braking valve 49*b*.

As described above, the left braking device 46*a* and the right braking device 46*b* can independently bring the left rear wheel 7R and the right rear wheel 7R into the braking state through the operation of the brake pedal 31L and the brake pedal 31R.

As shown in FIG. 1, a plurality of display devices 50 are provided around the operator seat 10. The plurality of display devices 50 include a first display device 50A provided in front of the operator seat 10 (the steering wheel 30) and include a second display device 50B provided on the side of the operator seat 10 (the steering wheel 30).

Figure 3:
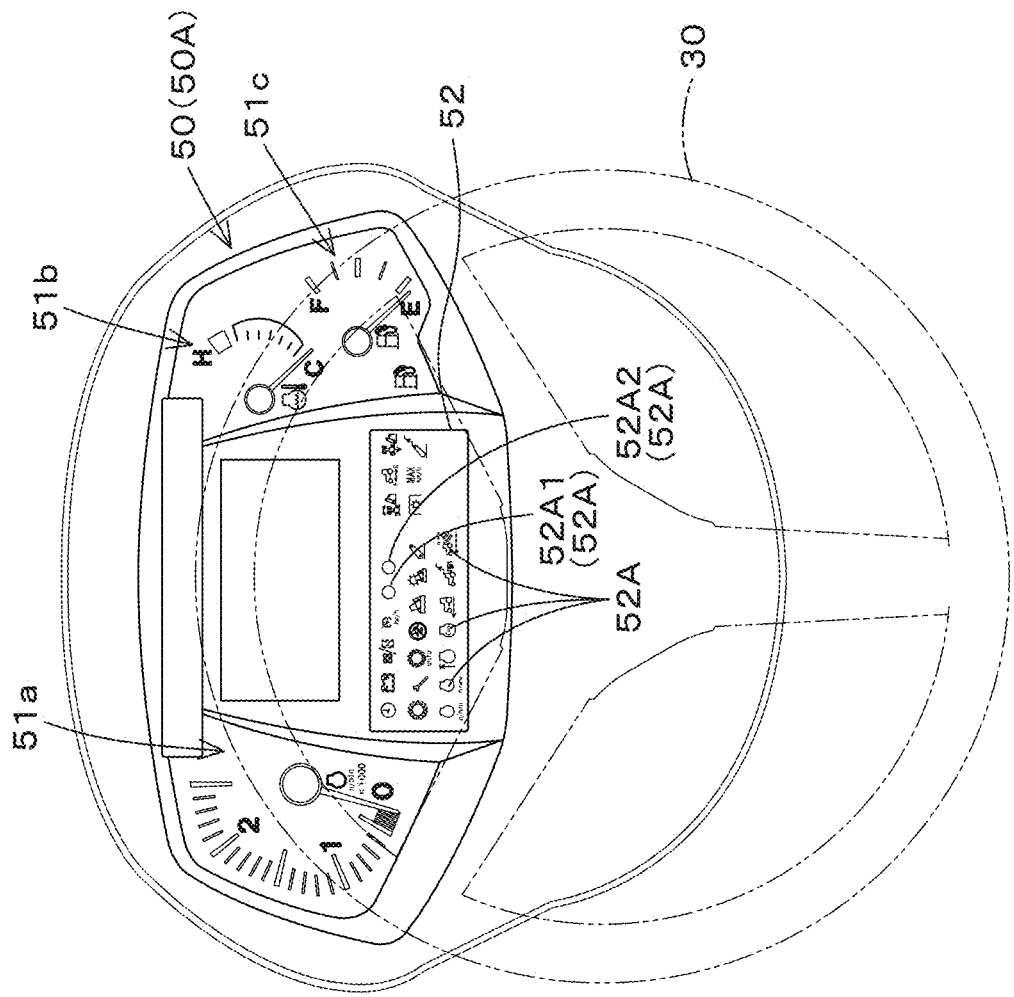
FIG. 3 is a view illustrating a first display device according to a preferred embodiment of the present invention.

As shown in FIG. 3, the first display device 50A is a meter panel or the like configured to mainly display various information regarding the operation, and includes a prime mover tachometer 51*a* configured to display a revolving speed of the prime mover 4, a water temperature meter 51*b*, and a fuel gauge 51*c*. In addition, the first display device 50A includes a notifier device 52 including a display lamp 52A that notifies various information by turning on/off the light. The first display device 50A shown in FIG. 3 is just an example, and is not limited to the configuration described above.

Similar to the first display device 50A, the second display device 50B is a device configured to mainly display information regarding various operations, and preferably is a touch panel or the like. Various types of menus are displayed on the second display device 50B, and the setting screen M1 is displayed by performing a predetermined operation as shown in FIG. 4, and various types of settings of the tractor 1 can be performed on the setting screen M1.

As shown in FIG. 1, the tractor 1 includes a controller device 40. The controller device 40 performs various types of controls of the tractor 1. The controller device 40 is connected to an accelerator sensor 42*a* configured to detect an operation extent of an accelerator 41*a*, an ignition switch 42*b*, a one-touch switch 42*c*, a vehicle-speed detector sensor 42*d* configured to detect a vehicle speed (a speed), a braking-operation detector sensor 42*e* configured to detect the operation extent of a braking-operation member 31 (a brake pedal 31L and a brake pedal 31R), a clutch lever sensor 42*f* configured to detect the position of the clutch lever 32B, a clutch-operation detector sensor 42*g* configured to detect the operation extent of the clutch pedal 32A, a sitting detector sensor 42*m*, and the like. The sitting detector sensor 42*m* is a sensor configured to detect whether or not the operator is sitting on the operator seat 10.

When the operation extent of the accelerator 41*a* is detected by the accelerator sensor 42*a*, the controller device 40 changes the revolving speed of the prime mover 4 (referred to as a prime mover revolving speed) according to the operation extent. The controller 40 starts the prime mover 4 through a predetermined process when the ignition switch 42*b* is turned on, and stops the driving of the prime mover 4 when the ignition switch 42*b* is turned off.

When the one-touch switch 42*c* is operated in a direction of rising (the upward-moving side), the controller device 40 controls the control valve to stretch the lift cylinder and consequently moves the working device upward. In addition, when the one-touch switch 42*c* is operated in a direction of lowering (the downward-moving side), the controller device 40 shortens the lift cylinder and moves the working device downward.

The controller device 40 performs the braking control based on values outputted from the braking-operation detector sensor 42*e*. In the braking control, when the operation of the brake pedal 31L is detected by the braking-operation detector sensor 42*e*, the controller device 40 operates the left hydraulic operating portion 48*a* to perform the braking by the left braking device 46*a*. In addition, in the braking control, when the operation of the brake pedal 31R is detected by the braking-operation detector sensor 42*e*, the controller device 40 operates the right hydraulic operating portion 48*b* to perform the braking by the right braking device 46*b*. In addition, in the braking control, when the operations of the brake pedal 31L and the brake pedal 31R are detected by the braking-operation detector sensor 42*e*, the controller device 40 activates the left hydraulic operating portion 48*a* and the left hydraulic operating portion 48*a*, so that the left braking device 46*a* and the right braking device 46*b* perform the braking operation.

When the clutch lever sensor 42*f* detects that the clutch lever 32B has been switched to the forward-traveling position (F), the controller device 40 magnetizes the solenoid of the forward-traveling switching valve 26 to switch the traveling clutch 5*d* to the forward-traveling side. When the clutch lever sensor 42*f* detects that the clutch lever 32B has been switched to the reverse position (R), the controller device 40 magnetizes the solenoid of the reverse-traveling switching valve 27 to switch the traveling clutch 5*d* to the reverse-traveling side. When the clutch lever sensor 42*f* detects that the clutch lever 32B has been switched to the neutral position (N), the controller device 40 demagnetizes the solenoids of the forward-traveling switching valve 26 and the reverse-traveling switching valve 27, and consequently the traveling clutch 5*d* is in the disengaging state.

The controller device 40 is capable of performing the auto switching control. The auto switching control is a control to switch the traveling clutch 5*d* from the engaging state to the disengaging state according to the operation of the braking-operation member 31 (the brake pedal 31L and the brake pedal 31R). That is, the auto switching control is performed to switch the traveling clutch 5*d* to the disengaged state with use of the braking-operation member 31 configured to perform the braking under the situation where the traveling clutch 5*d* is switched between the forward-traveling side and the reverse-traveling side.

A switching member 43 to switch the auto switching control between being valid and being invalid is connected to the controller device 40. The switching member 43 includes a switch 44. The switch 44 is installed around the operator seat 10 and is capable of being turned ON/OFF. At least when the auto switching control is invalid, the switch 44 switches the auto switching control from being invalid to being valid by being turned from OFF to ON. The clutch pedal 32A is one of the switching members 43, and when at least the auto switching control is valid, the clutch pedal 32A is operated to switch the auto switching control from being valid to being invalid.

Either one of the first display device 50A and the second display device 50B is capable of displaying whether the auto switching control is valid or invalid. For example as shown in FIG. 3, of the plurality of indicator lights 52A of the notifier device 52, the first indicator light 52A1 corresponding to the auto switching control is turned on when the auto switching control is valid, and the first indicator light 52A1 is turned off when the auto switching control is invalid. Alternatively, on a predetermined screen of the second display device 50B, the display portion corresponding to the auto switching control is turned on when the auto switching control is valid, and is turned off when the auto switching control is invalid.

The controller device 40 performs the first processing and the second processing as the auto switching control. In the first processing, the controller device 40 refers to the vehicle-speed detector sensor 42*d* when the braking-operation member 31 is operated, and the traveling clutch 5*d* is switched from the engaging state to the disengaging state when the vehicle speed of the traveling device detected by the vehicle-speed detector sensor 42*d* is less than the threshold value E1 (km/h). In addition, in the first processing, since the braking-operation member 31 is being operated, the braking by the left braking device 46*a* and the right braking device 46*b* is performed. That is, in the first processing, when the vehicle speed detected when the braking-operation member 31 is operated is less than the threshold value E1 (km/h), the traveling clutch 5*d* is disengaged in accordance with the operation of the braking-operation member 31 and the braking is performed.

On the other hand, in the second processing, the controller device 40 refers to the vehicle-speed detector sensor 42*d* when the braking-operation member 31 is operated, and does not switch the traveling clutch 5*d* from the engaging state to the disengaging state when the vehicle speed of the traveling device detected by the vehicle-speed detector sensor 42*d* is the threshold value E1 (km/h) or more. Also in the second processing, since the braking-operation member 31 is operated, the braking by the left braking device 46*a* and the right braking device 46*b* is performed. That is, in the second processing, when the vehicle speed detected when the braking-operation member 31 is operated is equal to or higher than the threshold value E1 (km/h), the traveling clutch 5*d* is held in the engaging state even when the braking-operation member 31 is operated, and the braking is performed. The threshold value E1 (km/h) is a relatively high speed and can be set to 15 km/h, for example.

As described above, in the auto switching control, when the vehicle speed of the traveling device is high, the traveling clutch 5*d* is held in the engaging state to perform the braking even when the braking-operation member 31 is operated, and when the vehicle speed of the traveling device is low, the traveling clutch 5*d* is held in the disengaging state to perform the braking when the braking-operation member 31 is operated.

When the first processing is performed, the notifier device 52 notifies that the first processing has been performed. For example, of the plurality of indicator lights 52A of the notifier device 52, the second indicator light 52A2 corresponding to the auto switching control is turned on when the first processing is performed, and is turned off when the first processing is not performed. Thus, since the first display device 50A has the first display lamp 52A1 and the second display lamp 52A2, it is possible to display the valid and the invalid of the auto switching control and to perform the display of the first processing.

In addition, the controller device 40 judges whether or not to execute the first processing on the basis of the operation states of both of the brake pedal 31L and the brake pedal 31R. For example, the controller device 40 does not perform the first processing when any one of the brake pedal 31L and the brake pedal 31R is operated, and performs the first processing when both of the brake pedal 31L and the brake pedal 31R are operated.

In addition, the controller device 40 may judge whether or not to execute the first processing on the basis of the operation extent W1 of each of the brake pedal 31L and the brake pedal 31R. The controller device 40 performs the first processing when the operation extent W1 of each of the brake pedal 31L and the brake pedal 31R, that is, the depression amount W1 of each of the brake pedal 31L and the brake pedal 31R is equal to or more than a threshold value E2 preliminarily determined. The controller device 40 does not execute the first processing when the operation extent (the depression amount) W1 is less than the threshold value E2.

Now, the second display device 50B is capable of setting the threshold value E1 of vehicle speed and setting the threshold value E2 of operation extent. As shown in FIG. 4, when a predetermined operation is performed, the setting screen M1 is displayed on the second display device 50B.

The second display device 50B displays the vehicle-speed input portion 100 on the setting screen M1. The vehicle-speed input portion 100 is a portion used to input the threshold value E1 of vehicle speed (km/h), and includes a button input portion 101, a slide input portion 102, and a numerical-value display portion 103. The button input portion 101 is a portion used to input the threshold value E1 of vehicle speed through a pressing operation, and includes an increasing input portion 101*a* to increase the threshold value E1 and includes a decreasing input portion 101*b* to decrease the threshold value E1. The slide input portion 102 is a portion used to input the threshold value E1 through a sliding operation, and includes a scale portion 102a and an index portion 102b.

The scale portion 102a is a scale indicating the magnitude of the threshold value E1 (a vehicle speed), and preferably includes a plurality of vertical bars (gauges) arranged parallel in the lateral direction, for example. In the scale portion 102a, one side of the vertical bars in the parallel direction, for example, the left side has the minimum value, and the other side in the parallel direction, for example, the right side has the maximum value. The index portion 102b is a portion that indicates the threshold value E1 with respect to the scale portion 102a, and is configured to move in the parallel direction of the vertical bars. The index portion 102b is configured to be moved along the scale portion 102a through a touching operation or the like. In addition, the index portion 102b moves in the scale portion 102a in association with the threshold value E1 inputted through the button input portion 101. For example, when the threshold value E1 is increased through the increasing input portion 101a, the index portion 102b moves in the direction to increase along the scale portion 102a. In addition, when the threshold value E1 is decreased through the decreasing input portion 101b, the index portion 102b moves in the direction to decrease along the scale 102a. The numerical-value display portion 103 displays, as a numeric number, the threshold value E1 set through the button input portion 101 and the slide input portion 102.

In the vehicle-speed input portion 100, the lower limit value of the threshold value E1 is preliminarily set, and the threshold value E1 is not allowed to be lower than the lower limit value preliminarily determined. For example, the lower limit value of the threshold value E1 is set to a value larger than an ultralow speed value such as 1 km/h.

The second display device 50B displays the operation-extent input portion 110 on the setting screen M1. The operation-extent input portion 110 includes a button input portion 111, a slide input portion 112, and a numerical-value display portion 113. The button input portion 111 is a portion used to input the threshold value E2 through a pressing operation, and includes an increasing input portion 111a to increase the threshold value E2 and a decreasing input portion 111b to decrease the threshold value E2. The slide input portion 112 is a portion used to input the threshold value E2 through a slide operation, and includes a scale portion 112a and an index portion 112b.

The scale portion 112a is a scale indicating the magnitude of the threshold value E2 (a vehicle speed), and preferably includes a plurality of vertical bars (gauges) arranged parallel in the lateral direction, for example. In the scale portion 112a, one side of the vertical bars in the parallel direction, for example, the left side has the minimum value, and the other side in the parallel direction, for example, the right side has the maximum value. The index portion 112b is a portion that indicates the threshold value E2 with respect to the scale portion 112a, and is configured to move in the parallel direction of the vertical bars. The index portion 112b is configured to be moved along the scale portion 112a through a touching operation or the like. In addition, the index portion 112b moves in the scale portion 112a in association with the threshold value E2 inputted through the button input portion 111. For example, when the threshold value E2 is increased through the increasing input portion 111a, the index portion 112b moves in the direction to increase along the scale portion 112a. In addition, when the threshold value E1 is decreased through the decreasing input portion 111b, the index portion 112b moves in the direction to decrease along the scale 112a. The numerical-value display portion 113 displays, as a numeric number, the threshold value E2 set through the button input portion 111 and the slide input portion 112.

Figure 5A:
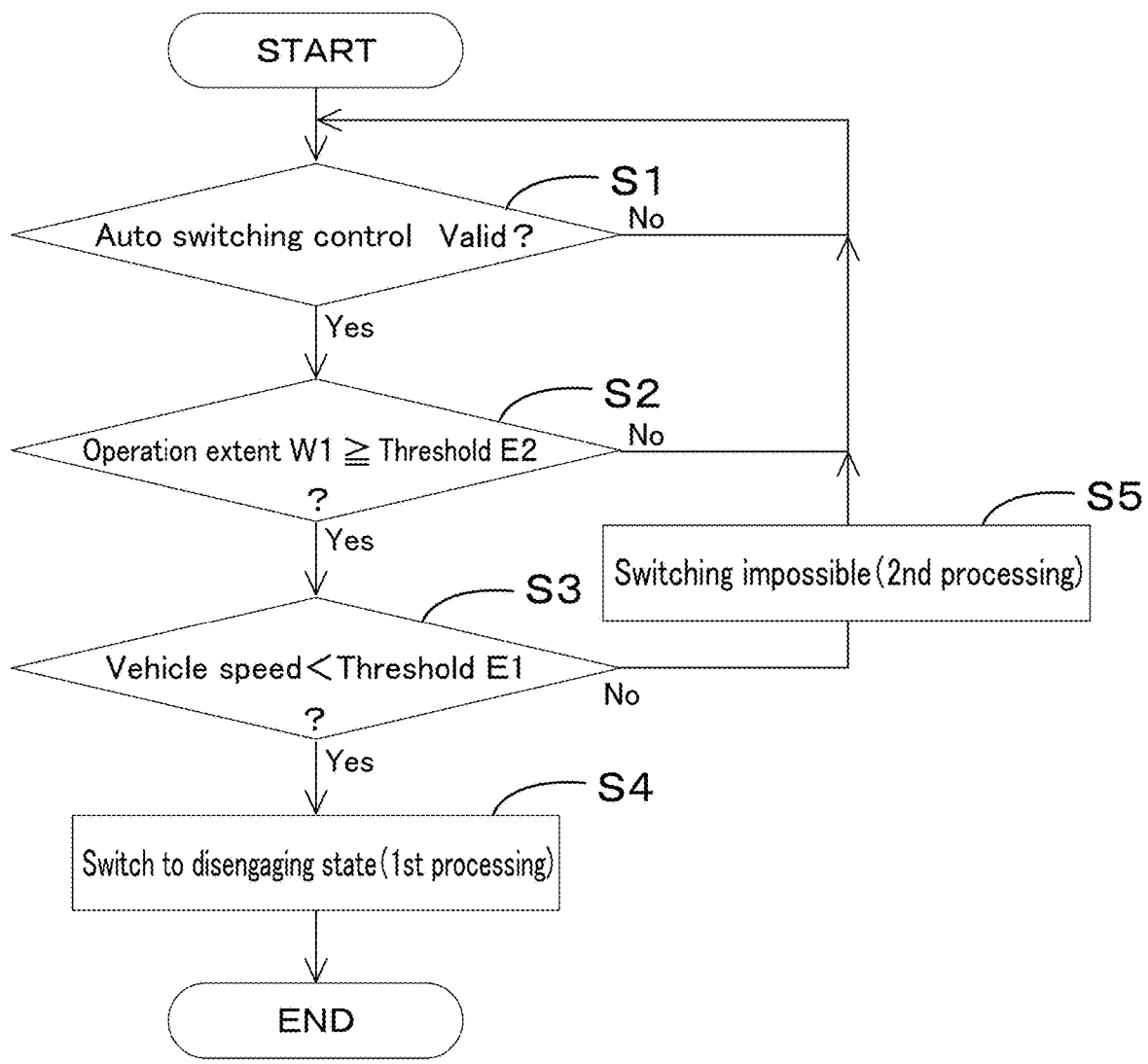
FIG. 5A is a view illustrating a flow to perform a first processing and a second processing in an auto-switching control according to a preferred embodiment of the present invention.
Figure 5B:
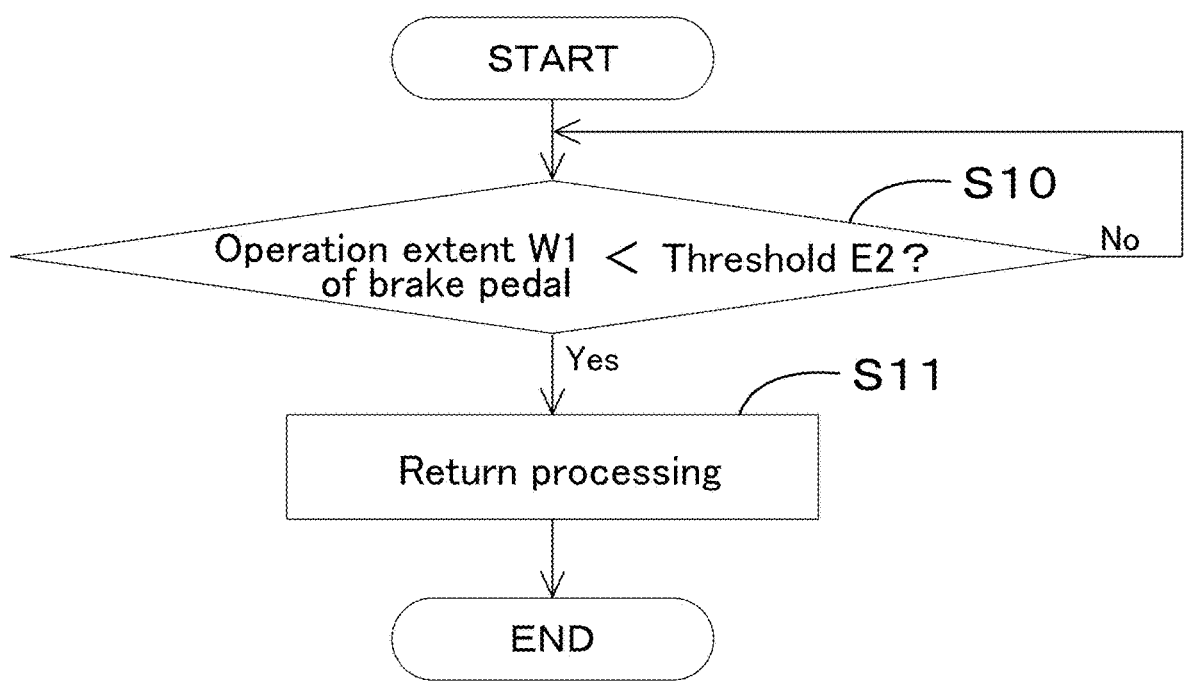
FIG. 5B is a view illustrating a flow provided when the brake pedal is operated after the first processing according to a preferred embodiment of the present invention.
Figure 5C:
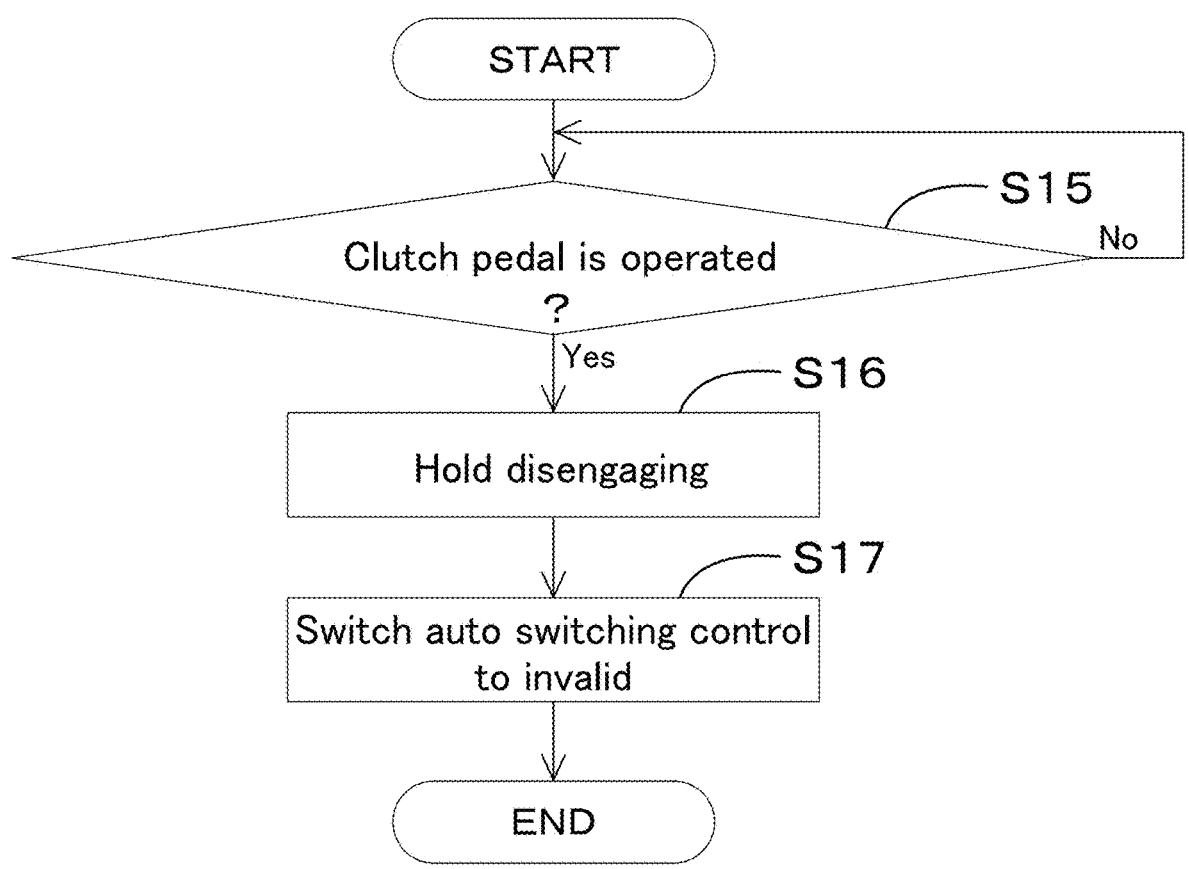
FIG. 5C is a view illustrating a flow provided when the clutch pedal is operated after the first processing according to a preferred embodiment of the present invention.

FIGS. 5A to 5C are views showing a flow of the auto switching control and the like executed by the controller device 40.

As shown in FIG. 5A, the controller device 40 judges whether the auto switching control is valid under a situation where the clutch pedal 32A is not operated and the clutch lever 32B is switched to either the forward-traveling position (F) or the reverse-traveling position (R) (step S1). When the auto switching control is valid (step S1, Yes), the controller device 40 judges whether the operation extent W1 of the brake pedal (the brake pedal 31L and the brake pedal 31R) is equal to or greater than the threshold value E2 (step S2). When the operation extent W1 is equal to or greater than the threshold value E2 (step S2, Yes), the controller device 40 judges whether the vehicle speed of the traveling device is less than the threshold value E1 (km/h) (step S3). When the vehicle speed of the traveling device is less than the threshold value E1 (km/h) (step S3, Yes), the controller device 40 switches the traveling clutch 5d from the engaging state to the released state (step S4). When the vehicle speed of the traveling device is less than the threshold value E1 (km/h) (step S3, Yes), the controller device 40 performs the first processing to switch the traveling clutch 5d from the forward traveling side or the reverse traveling side to the neutral state (step S4: the first processing). When the first processing is performed, the controller device 40 temporarily holds the position of the clutch lever 32B before performing the first processing (a position holding processing). When the vehicle speed of the traveling device is not less than the threshold value E1 (km/h) (step S3, No), the controller device 40 performs the second processing that does not perform the switching of the traveling clutch 5d (step S5).

After performing the first processing, the controller device 40 progresses to the post-disengaging processing shown in FIGS. 5B to 5C. As shown in FIG. 5B, in the post-disengaging processing, the controller device 40 judges whether or not the operation extent W1 of the brake pedal has become less than the threshold value E2 (step S10: a brake pedal judgement). At the brake pedal judgment S10, for example, after the first processing is executed in the state where the brake pedal is depressed (after step S4), the controller device 40 judges whether the depressing of the brake pedal is released, that is, whether the brake pedal is released. When the operation extent W1 of the brake pedal becomes less than the threshold value E2 due to the releasing of the brake pedal or the like (step S10, Yes), the controller device 40 performs a return processing S11 to return the traveling clutch 5d before performing the first processing. In the return processing S11, when the clutch lever 32B is held at the forward-traveling position (F) in the position holding processing, the controller device 40 returns the traveling clutch 5d to the forward-traveling side, and when the clutch lever 32B is held at the reverse-traveling position (R) in the position holding processing, the controller device 40 returns the traveling clutch 5d to the reverse-traveling side.

As shown in FIG. 5C, the controller device 40 judges whether or not the clutch pedal 32A has been operated (step S15: a clutch pedal judgment). In the clutch pedal judgment S15, for example, the controller device 40 judges whether or not the clutch pedal 32A is depressed after the first processing is executed in the state where the clutch pedal 32A is not depressed (after step S4).

In the clutch pedal judgment S15, when the clutch pedal 32A changes from the releasing state to the depressing state (step S15, Yes), the controller device 40 holds the disengaging state of the traveling clutch 5d (step S16), and switches the auto switching control from being valid to being invalid. (step S17).

FIGS. 6A and 6B are views summarizing a relation between the validation/invalidation of auto switching control, the position of the clutch lever, the vehicle speed, the operation of the clutch pedal, the operation of the brake pedal, and the like.

For convenience of the explanation, the state in which the clutch lever 32B is switched to either the forward-traveling position (F) or the reverse-traveling position (R) is referred to as a forward/reverse switching state. In addition, the OFF state of the clutch pedal represents that the operation extent of the clutch pedal 32A is less than a predetermined extent (less than a threshold value), and represents, for example, the releasing state. The ON state of the clutch pedal represents that the operation extent of the clutch pedal 32A is the predetermined amount or more (the threshold value or more), and represents, for example, the depressing state. The OFF state of the brake pedal represents that the operation extent W1 of the brake pedal is less than the threshold value E2, and represents, for example, the releasing state. The ON state of the brake pedal represents the operation where the operation extent W1 of the brake pedal is equal to or more than the threshold value E2, and represents, for example, the depressing state. In FIG. 6B, the pre-status shows the state where the operation is first performed, and the post-status shows the state where the clutch pedal 32A, the brake pedal, and the like are operated after the pre-status.

In addition, in FIGS. 6A and 6B, the "engaging" represents that the traveling clutch 5d is in the engaging state, and the "disengaging" represents that the traveling clutch 5d is in the disengaging state. In addition, the "Hold disengaging" represents that the disengaging state is maintained even in the post-status when at least the traveling clutch 5d is in the disengaging state in the pre-status. In addition, "Hold engaging" represents that the traveling clutch 5d is held in the engaging state even in the post-status at least when the traveling clutch 5d is in the engaging state in the pre-state. "Hold valid" represents that the valid is maintained even in the post-status when the auto switching control is valid at least in the pre-status. "Switch invalid" represents that the auto switching control is switched from being valid to being invalid in the post-status when the auto switching control is valid at least in the pre-status. In addition, in FIG. 6B, the ON state of the sitting detector sensor 42m represents that the sitting is detected. The OFF state represents that the sitting is not detected.

As shown in No. 1 to No. 8 of FIG. 6A, when the clutch pedal 32A is operated during the forward/reverse switching state when the auto switching control is invalid, the traveling clutch 5d is switched to either the engaging state or the disengaging state regardless of the brake pedal.

As shown in No. 9 to No. 16 in FIG. 6A, even when the clutch pedal 32A is operated in the state where the auto switching control is invalid and the clutch lever 32B is in the neutral position (N), the traveling clutch 5d is disengaged.

As shown in No. 17 of FIG. 6B, when the clutch pedal 32A and the brake pedal are not operated during the forward/reverse switching state when the auto switching control is valid, the traveling clutch 5d is in the disengaging state. After that, as shown in No. 18, when the brake pedal is operated in the state where the clutch pedal 32A is not operated, the first processing is performed in the case where the vehicle speed detected when the brake pedal is operated is less than the threshold value E1, and then the traveling clutch 5d can be disengaged. After the first processing is performed, in the state where the sitting detector sensor 42m detects the sitting (ON) and then the sitting is no longer detected (OFF), the controller device 40 holds the traveling clutch 5d in the disengaged state (hold disengaging), resets of the position of the clutch lever 32B in the position holding process (initializing), and sets the traveling clutch to the neutral position (N). On the other hand, even when the brake pedal is operated and the sitting is detected by the sitting detector sensor 42m (ON) after the first processing is performed, the controller device 40 holds the traveling clutch 5d in the disengaging state (hold disengaging), resets the position of the clutch lever 32B in the position holding processing (initializing), and sets the traveling clutch to the neutral position (N).

In addition, as shown in No. 18, when the traveling clutch 5d is operated after the first processing (after the pre-status), the auto switching control is switched from being valid to being invalid (switch invalid). In addition, as shown in No. 18, when a changeover switch (the switch SW) is turned off after the first processing, the traveling clutch 5d is held in the disengaging state (hold disengaging), resets the position of the clutch lever 32B in the position holding processing (initializing), and sets the traveling clutch to the neutral position (N).

As shown in No. 19, when the clutch pedal 32A is operated without operating the brake pedal during the forward/reverse switching state in the state where the auto switching control is valid, the traveling clutch 5d is in the disengaging state. Then, as shown in No. 19, when both of the clutch pedal 32A and the brake pedal are operated, the auto switching control is switched from being valid to being invalid (switch invalid).

As shown in No. 21, when the clutch pedal 32A and the brake pedal are not operated during the forward/reverse switching state in the state where the auto switching control is valid, the traveling clutch 5d is in the engaging state. Then, as shown in No. 21, when the brake pedal is operated in the state where the clutch pedal 32A is not operated, the second processing is executed and the auto switching control is switched from being valid to being invalid (switch invalid).

As shown in No. 22, when the vehicle speed detected when the brake pedal is operated is equal to or higher than the threshold value E1 during the forward/reverse switching state in the state where the auto switching control is valid, the second processing is performed, and thus the traveling clutch 5d is in the engaging state. In addition, as shown in No. 22, when the clutch pedal 32A is operated after the second processing, the auto switching control is switched from being valid to being invalid (switch invalid).

As shown in No. 23, when the brake pedal is operated during the forward/reverse switching state in the state where the auto switching control is valid, the traveling clutch 5d is in the disengaging state. Then, as shown in No. 23, when the brake pedal is operated, the auto switching control is switched from being valid to being invalid (switch invalid).

As shown in No. 25 to No. 32, in the state where the auto switching control is valid and the clutch lever 32B is in the neutral position (N), the traveling clutch 5d is maintained in the disengaging state regardless of the operation of the clutch pedal 32A. Under the situation shown in No. 26 and No. 30, when the clutch pedal 32A is started to be operated in the state where the clutch pedal 32A is not operated, the auto switching control is switched from being valid to being invalid (switch invalid). In addition, as shown in No. 26 and No. 30, when the brake pedal is started to be operated in the state where the clutch pedal 32A is not operated, the auto switching control is switched from being valid to being invalid (switch invalid).

The working vehicle 1 includes the traveling clutch 5d configured to be switched between the engaging state allowing the power to be transmitted to the traveling device and the disengaging state cutting the power to be transmitted to the traveling device, the braking devices to brake the traveling device according to the operation of the braking-operation member 31, the controller device 40 to perform the braking control to perform the braking according to the operation of the braking-operation member 31, and the auto-switching control to switch the traveling clutch 5d from the engaging state to the disengaging state according to the operation of the braking-operation member 31, and the switching member 43 to switch the auto-switching control between to be valid and to be invalid. The controller device 40 performs the first processing to switch the traveling clutch 5d from the engaging state to the disengaging state when the braking-operation member 31 is operated in a case where the auto-switching control is valid and a vehicle speed of the traveling device is less than a threshold, and the second processing to prevent the traveling clutch 5d from being switched from the engaging state to the disengaging state even when the braking-operation member 31 is operated in a case where the vehicle speed of the traveling device is equal to or higher than the threshold. As a result, when the vehicle speed of the traveling device is less than the threshold value and the vehicle speed is relatively low, the traveling clutch 5d can be switched from being in the engaging state to being in the disengaged state by operating the braking-operation member 31. In this manner, even when the traveling clutch 5d is not manually switched, the working vehicle 1 can be stopped smoothly. In addition to this configuration, when the vehicle speed of the traveling device is equal to or higher than the threshold value and the vehicle speed is relatively high, the traveling clutch 5d is engaged without being disengaged, so that, for example, the working vehicle 1 is capable of stopping smoothly due to the braking by mechanical resistance of the prime mover or the like and to the braking by the braking-operation member 31.

The working vehicle 1 includes the operator seat 10, and the sitting detector sensor 42m to detect whether an operator is sitting on the operator seat 10. The controller device 40 holds the traveling clutch 5d in the disengaging state when the sitting detector sensor 42m does not detect that the operator is sitting on the operator seat 10 after the first processing. According to this configuration, even when the operator leaves the operator seat 10, the disengaging state of the clutch device 5d can be maintained (held).

The working vehicle 1 includes the notifier device 52 to notify that the first processing has been performed. According to this configuration, the operator can easily recognize that the traveling clutch 5d is automatically disengaged.

The braking-operation member 31 includes the plurality of operating portions to perform the operation of the braking-operation member 31. The controller device 40 performs the first processing when the plurality of operating portions perform the operation of the braking-operation member 31. According to this configuration, when the braking is performed through the operation of at least the plurality of operating portions, it is possible to perform the braking while setting the traveling clutch 5d to the disengaged state. For example, when the plurality of operation portions are the brake pedal 31L and the brake pedal 31R, the braking can be performed while setting the traveling clutch 5d to the disengaged state only when both the brake pedal 31L and the brake pedal 31R are operated.

The switching member 43 includes the clutch-switching member 32 to switch the traveling clutch 5d from the engaging state to the disengaging state. The controller device 40 switches the auto-switching control from being valid to being invalid when the clutch-switching member 32 is operated in the state where the auto-switching control is valid. According to this configuration, in the state where the traveling clutch 5d can be disengaged through the operation of the braking-operation member 31, it is possible to invalidate the auto switching control for disengaging the clutch 5d through the operation of the braking-operation member 31, only by operating the clutch-switching member 32 configured to disengage the traveling clutch 5d.

The controller device 40 switches the auto-switching control from being valid to being invalid when the clutch-switching member 32 and the braking-operation member 31 are operated in the state where the auto-switching control is valid. According to this configuration, it is possible to easily invalidate the auto switching control through the operation of the clutch-switching member 32 while operating the braking-operation member 31.

The controller device 40 judges whether to perform the first processing according to the operation extent of the braking-operation member 31. According to this configuration, for example, the first processing is not performed when the operation extent of the braking-operation member 31 is small, while the first processing can be operated when the operation extent of the braking-operation member 31 is large. For example, the first processing can be performed or not performed depending on the state of working in the working vehicle 1.

The working vehicle 1 includes the display device 50 to set the operation extent for determining to perform the first processing. According to this configuration, for example, the operator can easily set the operation extent for performing the first processing while watching the display device 50.

The working vehicle 1 includes the display device 50 to set a threshold of the vehicle speed. According to this configuration, for example, the operator can easily set the threshold value of the vehicle speed as to whether or not to perform the first processing while watching the display device 50.

The working vehicle 1 includes the display device 50 to display that the auto-switching control is valid or invalid and to display the first processing. According to this configuration, for example, the operator can easily recognize whether the auto switching control is valid or invalid, or whether the first processing is performed, by watching the state displayed on the display device 50.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a traveling clutch to be switched between:
   an engaging state allowing power to be transmitted to a traveling device; and
   a disengaging state cutting the power to be transmitted to the traveling device;
   a brake to brake the traveling device according to an operation of a brake operator;

a controller to perform:
  a braking control to perform the braking according to the operation of the brake operator; and
  an auto-switching control to switch the traveling clutch from the engaging state to the disengaging state according to the operation of the brake operator;
a switch to switch the auto-switching control between valid and invalid;
an operator seat; and
a sitting detector sensor to detect whether an operator is sitting on the operator seat; wherein
the controller performs:
  a first processing to switch the traveling clutch from the engaging state to the disengaging state when the brake operator is operated in a case where the auto-switching control is valid and a vehicle speed of the traveling device is less than a threshold; and
  a second processing to prevent the traveling clutch from being switched from the engaging state to the disengaging state even when the brake operator is operated in a case where the vehicle speed of the traveling device is equal to or higher than the threshold; and
the controller holds the traveling clutch in the disengaging state when the sitting detector sensor does not detect that the operator is sitting on the operator seat after the first processing.

2. A working vehicle comprising:
a traveling clutch to be switched between:
  an engaging state allowing power to be transmitted to a traveling device; and
  a disengaging state cutting the power to be transmitted to the traveling device;
a brake to brake the traveling device according to an operation of a brake operator;
a controller to perform:
  a braking control to perform the braking according to the operation of the brake operator; and
  an auto-switching control to switch the traveling clutch from the engaging state to the disengaging state according to the operation of the brake operator; and
a switch to switch the auto-switching control between valid and invalid; wherein
the controller performs:
  a first processing to switch the traveling clutch from the engaging state to the disengaging state when the brake operator is operated in a case where the auto-switching control is valid and a vehicle speed of the traveling device is less than a threshold; and
  a second processing to prevent the traveling clutch from being switched from the engaging state to the disengaging state even when the brake operator is operated in a case where the vehicle speed of the traveling device is equal to or higher than the threshold; and
the working vehicle further comprises a notifier to notify that the first processing has been performed.

3. The working vehicle according to claim 1, wherein the brake operator includes:
a plurality of operator portions to perform the operation of the brake operator; wherein
the controller performs the first processing when the plurality of operator portions perform the operation of the brake operator.

4. A working vehicle comprising:
a traveling clutch to be switched between:
  an engaging state allowing power to be transmitted to a traveling device; and
  a disengaging state cutting the power to be transmitted to the traveling device;
a brake to brake the traveling device according to an operation of a brake operator;
a controller to perform:
  a braking control to perform the braking according to the operation of the brake operator; and
  an auto-switching control to switch the traveling clutch from the engaging state to the disengaging state according to the operation of the brake operator; and
a switch to switch the auto-switching control between valid and invalid; wherein
the controller performs:
  a first processing to switch the traveling clutch from the engaging state to the disengaging state when the brake operator is operated in a case where the auto-switching control is valid and a vehicle speed of the traveling device is less than a threshold; and
  a second processing to prevent the traveling clutch from being switched from the engaging state to the disengaging state even when the brake operator is operated in a case where the vehicle speed of the traveling device is equal to or higher than the threshold;
the switch includes a clutch switch to switch the traveling clutch from the engaging state to the disengaging state; and
the controller switches the auto-switching control from being valid to being invalid when the clutch switch is operated under a state where the auto-switching control is valid.

5. The working vehicle according to claim 4, wherein the controller switches the auto-switching control from valid to invalid when the clutch switch and the brake operator are operated in the state where the auto-switching control is valid.

6. The working vehicle according to claim 1, wherein the controller judges whether to perform the first processing according to an operation extent of the brake operator.

7. The working vehicle according to claim 6, further comprising a display to set the operation extent for determining to perform the first processing.

8. The working vehicle according to claim 1, further comprising a display to set a threshold of the vehicle speed.

9. The working vehicle according to claim 1, further comprising a display to display that the auto-switching control is valid or invalid and to display the first processing.

* * * * *